United States Patent Office 3,231,382

Patented Jan. 25, 1966

3,231,382
PRINTING PLATE COMPOSITIONS

Julius L. Silver, Somerset, N.J., assignor to Union Carbide Corporation, a corporation of New York No Drawing. Filed Apr. 3, 1964, Ser. No. 357,265
14 Claims. (Cl. 96—85)

This application is a continuation-in-part of application Serial No. 129,555, filed on August 7, 1961, now abandoned, and application Serial No. 129,954, filed August 8, 1961, now abandoned both of which applications are hereby incorporated herein by reference.

This invention relates to photomechanical reproduction and improvement therein. In a particular aspect, this invention relates to photosensitive resin compositions useful for the preparation of continuous tone and half-tone planographic printing plates.

At the present time virtually all printed copy is produced through the use of three basic types of printing plates. One type is a relief plate which prints from a raised surface. Another type is an intaglio plate which prints from a depressed surface. The third type is the planographic plate which prints from a flat surface which is neither raised above nor depressed below the adjacent and surrounding non-printing area.

Planographic printing plates have water-repellent (hydrophobic), oil-receptive (oleophilic) image areas; and water-receptive (hydrophilic) non-image areas. Offset lithography is the most widely known printing method which employs planographic printing plates. One type of lithographic plate is prepared by applying a thin coating of a diazo dye to a suitable support material, exposing the coating to the action of light passing through a negative of the picture to be printed causing the diazo coating to become crosslinked and hence water repellent and oil receptive in the image area, and then washing away the unexposed, unreacted coating with a suitable developer. Since the plate support material is itself water receptive, those portions of the plate from which the unreacted coating has been removed by the developer solution become the non-image area.

On diazo-type lithographic printing plates made as described above, all portions of the image area accept and print the same amount of ink per unit of area, and all parts of the non-image area totally reject the greasy printing ink. Consequently, in order to obtain gradations in tone, or intermediate shades of color or tints, it has been generally necessary to use the so-called "half-tone dot structure" printing plate. In this process the printing plate, and the corresponding picture reproduced therefrom, are broken down into myriad dots by using half-tone negatives during exposure of the printing plate. While each individual dot prints with the same color intensity, the effect of tones and shades is created by virtue of different sizes of dots in the various parts of the printing plate and the printed picture produced therefrom. The half-tone technique is widely used but it has several disadvantages. In pictures containing regularly repeating or symmetrically disposed elements, the dots frequently form visible moiré patterns, i.e., patterns which give a watery or cloudy effect. Color purity is poor and boundaries are ill defined and not readily controllable.

There is another planographic printing method, known as Collotype, which is unique among the presently known printing processes in that it provides continuous tone reproduction. In this latter process, the support material for the planographic plates is coated with a photosensitive gelatin which is initially soft and hydrophilic, but becomes progressively harder and less hydrophilic when acted upon by light. Thus, when the coated plate is exposed to light through a negative, it appears that each area of the coating hardens in proportion to the amount of light which it requires and consequently it becomes proportionally less hydrophilic. As a result, the various parts of the exposed coating accept water in an amount inversely proportional to the intensity of light they received and accept a complementary amount of ink in an amount directly proportional to the intensity of light which has acted upon the area.

Two deficiencies of the Collotype process stem largely from the inherent shortcomings of the photosensitive gelatin itself. Collotype printing plates can be used for only a few thousand reproductions due to the weakness of the gelatin. It is difficult to obtain prints of the same color density throughout a press run because the gelatin absorbs and releases water too rapidly, and the total water absorption capacity of the gelatin, which depends upon a highly critical "tanning" step, is not easily controllable nor reproducible.

It is therefore an object of the present invention to provide photosensitive resin compositions, useful as photosensitive planographic plates, which are tougher and more durable than gelatin-base plates employed in Collotype continuous tone printing.

It is another object of the present invention to provide planographic printing plates which are more flexible than metal base plates but do not kink and scratch in the manner of metal base plates.

It is another object of the present invention to provide tack-free planographic printing plates upon which can be formed continuous tone exposures and then employed directly in printing operations without any developing procedure.

It is another object of the present invention to provide continuous tone planographic plates which permit control of color density and uniformity of reproduction.

It is another object of the present invention to provide planographic printing plates which can be used to reproduce pictures with good color purity and well-defined boundaries by the half-tone technique.

Other objects and advantages of this invention will become apparent to those skilled in the art accompanying description and disclosure.

Accordingly, one or more objects of the present invention are accomplished by the provision of photosensitive compositions which comprise in intimate association (1) a normally solid ethylene oxide polymer, (2) a heat fusible phenolic resin formed by the condensation of a phenolic compound and an aldehyde, (3) a photosensitizing compound which when acted upon by light energy at ambient temperatures yields free radicals capable of reaction with said phenolic resin, and (4) a non-oxidizing, photo insensitive basic compound exhibiting a pH greater than 7.

The ethylene oxide polymer component of the compositions is selected from water soluble resinous ethylene oxide polymeric materials having an average molecular weight in the range of from about 50,000 to about 10,000,000, which are readily soluble in water. The term "ethylene oxide polymers" refers to polymers possessing the repeating unit (—$CH_2$—$CH_2O$—) as represented by the class of commercial Polyox resins; and the term is intended to include water soluble ethylene oxide polymer resins wherein ethylene oxide is the predominant monomer polymerized therein but which can also contain polymerized residues of other olefin oxides as exemplified by copolymers and terpolymers of ethylene oxide with other copolymerizable monomers containing single epoxied groups such as propylene oxide, butylene oxide, styrene oxide and the like. Poly(ethylene oxide) homopolymer is however preferred as the ethylene oxide polymer resin and shall be used hereinafter as representative of these resins.

The phenolic resin component of the compositions of the present invention are the heat fusible condensation products of a phenol with an aldehyde. Such condensation products are divided into two classes, resoles an novolaks, either of which can be used in this invention as is shown hereinafter. These two types of resins are discussed in order below. Both of these classes of phenolic resins will form an association with ethylene oxide polymers; compositions containing these association products and a suitable photosensitizing compound, are photosensitive and when placed on a support as a thin film and cured, will comprise a planographic printing plate suitable for reproduction in continuous tone for large numbers of faithfully detailed copies.

While these phenolic resins are in the fusible form when making the association product (as hereinafter more clearly set forth) the fusible condition is not necessarily a critical condition of the association product, in which it is possible for a portion or all of the phenolic resin component to be fully advanced to the cured state.

The fusible resole phenolic resins can advance upon heating to a degree of cure and polymerization to attain a completely insoluble state. These insoluble phenolics cannot be used in the preparation of the present compositions but are believed to be present in the cured printing plate compositions of this invention. In the preparation of the present compositions only those heat fusible phenolic resins which are soluble in water, alkali or organic solvents such as acetone, ethanol and the like and which are sufficiently fusible to permit admixture and association with the ethylene oxide polymers can be used. These resins include those resole phenolic resins which have not cured to a degree of insolubility as well as the novolak resins discussed below.

RESOLE RESINS

Resole resins are produced by the condensation of phenols and aldehydes under alkaline conditions. Resoles differ from novolaks in that polynuclear methylol-substituted phenols are formed as intermediates in resoles. A resole produced by the condensation of phenol with foraldehyde most likely proceeds through an intermediate having the following illustrated type structure:

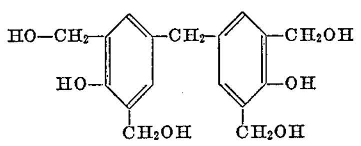

In a typical synthesis, resoles are prepared by heating one mole of phenol with 1.5 moles of formaldehyde under alkaline conditions.

The resole resins are prepared by the condensation of phenol with formaldehyde or, more generally, by the reaction of a phenolic compound, having two or three reactive aromatic ring hydrogen positions, with an aldehyde or aldehyde-liberating compound capable of undergoing phenol-aldehyde condensation. Illustrative of phenolic compounds are cresol, xylenol, ethylphenol, butylphenol, isopropylmethoxyphenol, chlorophenol, resorcinol, hydroquinone, naphthol, 2,2-bis(p-hydroxyphenyl)propane, and the like. Illustrative of aldehydes are formaldehyde, acetaldehyde, acrolein, crotonaldehyde, furfural, and the like. Illustrative of aldehyde-liberating compounds are for example, paraformaldehyde, formalin and 1,3,5-trioxane. Ketones such as acetone are also capable of condensing with the phenolic compounds, as are methylene engendering agents such as hexamethylenetetramine.

The condensation of phenolic compound and aldehyde is conducted in the presence of alkaline reagents such as sodium carbonate, sodium acetate, sodium hydroxide, ammonium hydroxide, and the like. When the condensation reaction is completed, if desired, the water and other volatile materials can be removed by distillation, and the catalyst neutralized.

NOVOLAK RESINS

The novolak resins are prepared in a manner similar to that used to prepare the resole resins. The distinguishing exception in this preparation is however that the reaction is conducted in an acidic medium, instead of an alkaline media as is the case with the resoles. When less than six moles of formaldehyde are used per seven moles of phenol the products are permanently fusible and soluble. These are the novolak resins. The novolaks have a different structure than the resoles as is illustrated by the novolak condensation products of phenol with formaldehyde:

(a)

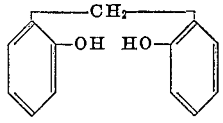

(b)

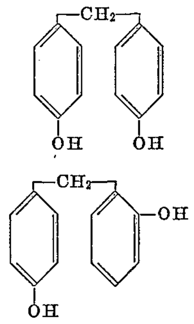

The novolaks can be further reacted with formaldehyde or with a methylol yielding compound such as hexamethylene tetramine, to a state of cure which is similar in the nature to the curing pattern of the resoles.

In a typical synthesis novolaks are prepared by heating one mole of phenol with 0.5 mole of formaldehyde under acidic conditions. The temperature at which the reaction is conducted is generally from about 25° C. to about 175° C.

The reactants which can be used in the preparation of the novolaks are the same as those used in the preparation of the resoles which are described and listed above.

While as previously stated both the resole resins and the novolak resins can be employed in the compositions of the present invention, it is preferred to use the resole resins, as printing plates formed from compositions utilizing them give sharper prints and have a longer printing life.

The most suitable fusible resole resins are those which are insoluble in water but readily soluble in conventional organic solvents such as methyl ethyl ketone, acetone, methanol, ethanol, and the like. Resole resins having a particularly desirable combination of properties are those which have an average molecular weight in the range between about three hundred fifty and six hundred. It is believed that these resole resins contain an average of at least one methylol group per aromatic nucleus.

The photosensitive component of the compositions is selected from the sensitizer agents used in the industry which when acted upon by light energy at ambient temperatures yield free radicals capable of reaction with the phenolic resin component thereby "hardening" or increasing the molecular weight of the phenolic resin. Suitable sensitizers include the halogenated lower alkyls such as bromoform, iodoform and the like; the water soluble hexavalent chromium compounds such as ammonium dichromate, sodium dichromate and the like; and the diazo, diazonium and azido compounds such as ortho quinone diazide, rosin derivatives of diazonaphthol, azido styryl ketones, 2-methyl-benzene diazonium fluoborate, 1,5-naphthalene tetrazonium fluoborate and the like. Generally applicable are compounds which are halogen sources and which will liberate halogen under the action of light. Such compounds include halogenated paraffins, hydrogen halides, and the like. Among the preferred photosensitizers are the halogen releasing type. Particularly preferred compounds of this class of photosensitizers are alkyl and alkylene iodides. The photosensitizing ability of the various iodides is a function of quantum yield,[1] which in turn depends on the chemical structure of the respective iodides. Generally, the quantum yield increases as the number of iodine atoms in the compounds increases, and as the length of the hydrocarbon chain increases. The quantum yield is also higher if the iodine atoms are on a tertiary carbon atom rather than a primary or secondary carbon atom. On this basis, the photosensitizing ability of various iodides, in the order of increasing efficiency, is exemplified by the following sequence:

$$CH_3I<CH_3CH_2I<CH_3(CH_2)_2I<CH_3(CH_2)_3I<(CH_3)_3CI<CH_2I_2<CHI_3$$

Iodoform is a particularly outstanding photosensitizing agent in the practice of the present invention.

The non-oxidizing basic component of the phosensitive compositions is selected from organic and inorganic alkaline compounds or alkaline reacting compounds. The term "basic" refers to compounds which have a reactivity equivalent to a pH above 7 in water, and preferably, for the purpose of this invention, above 9. Suitable basic compounds include alkali metal and alkaline earth metal hydroxides, organic and inorganic basic salts, organic bases such as amines and amides, and the like. Illustrative of the suitable basic compounds are lithium hydroxide, sodium hydroxide, potassium hydroxide, magnesium hydroxide, calcium hydroxide, strontium hydroxide, cadmium hydroxide, barium hydroxide, aluminum hydroxide, ammonium hydroxide, sodium borate, potassium carbonate, sodium carbonate, potassium phosphate, sodium phosphate, sodium acetate, potassium acetate, sodium stearate, potassium stearate, lithium stearate, barium stearate, sodium oleate, potassium oleate, magnesium palmitate, acetamide, stearamide, palmitamide, behenamide, oleamide, dibutylamine, didecylamine, tridecylamine, ethylenediamine, triethylenetetramine, morpholine, diphenylurea, triethanolamine, pyrrolidine, and the like. The salts of organic acids containing between about 10 and 30 carbon atoms are particularly advantageous. Also advantageous and preferred is the use of the combination of an alkali metal or alkaline earth metal salt of a fatty acid in mixture with a strong inorganic base such as calcium hydroxide. It should be noted that the basic component functions independently of the photosensitizing agent and in a different manner. While various photosensitizing agents may exhibit an aqueous pH value greater than 7, the inherent photoreactivity of these agents renders them unsuitable for use as basic components within the terms of this invention. The basic components of this invention are non-photosensitive i.e. exhibit no photoresponse which would photosensitize the compositions of this invention. Additionally, it should be noted that the basic component of the compositions of this invention are non-oxidizing. Any basic compound can be used which is normally used to catalyze the condensation of a phenolic compound and an aldehyde to form a resole phenolic resin. Such basic catalysts are well known to the art.

In another embodiment of this invention, compositions exhibiting greater ease of mechanical processing are proposed whereby a polyhydric aromatic compound containing from 6 to 12 carbon atoms inclusive, from 2 to 4 aromatic hydroxyl groups, and at least 2 aromatic hydrogen atoms in the reactive ortho, para or meta positions on the nucleus, is incorporated into the printing plate compositions of the present invention.

The polyhydric aromatic compounds can contain ring substitutents such as halogen alkyl and the like. Illustrative of the polyhydric aromatic compounds are 1,2-dihydroxy benzene, 1,3-dihydroxy benzene, 1,4-dihydroxy benzene, 5-chloro-1,3-dihydroxy benzene, 5-methyl-1,3-dihydroxy benzene, 1,3,5-trihydroxy benzene, 1,3-dihydroxy naphthalene, 1,4-dihydroxy naphthalene, and the like.

It is desirable that the ratio of components in the photosensitive compositions be within specific limits in order to obtain satisfactory results when the compositions are employed in the preparation of planographic printing plates. The quantity of ethylene oxide polymer in the compositions can vary between about 0.2 and 3 parts by weight per part of phenolic resin, with the preferred ratio being between about 0.6 and 1.8 parts of ethylene oxide polymer per part of phenolic resin. The quantity of photosensitizer, when incorporated as a component in the compositions, can vary from about 0.08 to 0.2 part by weight per part of phenolic resin, with the preferred ratio being between 0.1 and 0.13 part of photosensitizer per part of phenolic resin. The ratio of these components varies depending on the particular characteristics of the respective components, the presence or absence of fillers and other similar materials, and the particular combination of properties sought in the compositions.

The basic component is generally employed in a quantity which is sufficient to eliminate tackiness when the photosensitive composition is sheeted on a calender or shaped in the form of a printing plate. The minimum quantity of the basic component sufficient to reduce tackiness depends on many factors, such as the base strength of the basic component, the particular phenolic resin component employed, the ratio of phenolic resin to ethylene oxide polymer resin, and the like. The quantity of basic component should be sufficient to allow pressing of the photosensitive composition into a tack-free printing plate. The quantity of basic component will generally vary in the range between 1 and 50 weight percent, based on the weight of phenolic resin, and more generally will vary in the range between 5 and 15 weight percent.

The polyhydric aromatic component is conveniently employed in a quantity varying between 0 and 0.4 part by weight per part of phenolic resin, and preferably a quantity between 0.2 and 0.3 part by weight.

Two general methods can be employed to prepare the photosensitive compositions of the present invention. In the first method, the poly(ethylene oxide) resin component is mixed with the phenol and aldehyde reaction mixture employed to prepare the resole resin. In the second method, the phenolic resin is prepared separately and then admixed with the ethylene oxide polymer on a two roll mill or in a Banbury blender in the presence of some water.

In the first method, the ethylene oxide polymer is added to the aqueous solution of phenol, aldehyde and catalytic agents in the reaction vessel. After a reaction period of between about one-half hour to three hours, volatile components of the reaction mixture are distilled until the temperature of the reaction mixture rises to about 90° C. to 100° C., and the resulting product is a gel-like mass. This material is then milled on a two-roll mill set at about 100° C. until enough water is removed to yield a rubbery sheet. Then the material is milled further with addition of a water solution of basic component, and optionally polyhydric aromatic compound and photosensitizing component if it is desired to incorporate these components into the composition. Milling is continued until the material is fairly dry and a thin sheet can be stripped off the mill.

The second method is preferred since it permits the

[1] Quantum yield refers to the number of molecules reacting chemically per photon of light absorbed.

use of previously prepared resole resin and it also allows better control of the ratio of poly(ethylene oxide) to phenolic resin. Generally, the poly(ethylene oxide) resin basic component, and again optionally the polyhydric aromatic compound and photosensitizer are mixed with enough water to form a paste and is then charged to a two-roll mill which has one roll set at about 100° C. and the other at about 90° C. As the mixture mills into a sheeted material, the resole resin is slowly added and the action of the heat and milling drives off most of the water to produce a tough and flexible sheet.

The plastic-base material prepared by either of the two methods described above can be readily pressed into smooth sheets of any thickness. A convenient pressing cycle is to set the press platens at a temperature of 130° C. and a pressure of about 300 p.s.i. and to press for a period of about three minutes.

The material can also be calendered to yield flat sheets which can then be pressed. The calendering operation is most conveniently performed by setting the calender roll temperatures at progressively lower temperatures from roll to roll. Calendering is advantageous in that the material is fairly uniform in gauge before pressing which permits a shorter press cycle. The pressing operation forms the plate surface and it also tends to modify the composition so as to eliminate tackiness. The temperature at which the material is pressed can vary from about 110° C. up to about 190° C. for best results.

The photosensitizing agent of the compositions can be included as a component in the preparation of the printing plate material as described in the above methods, or it can be withheld until the composition has been formed into a sheet or shaped into a printing plate and then applied in solution form to the surface of the plate. The photosensitizing component is conveniently coated on the plates in this manner as a solution in solvents such as carbon tetrachloride, benzene, carbon disulfide, diethyl ether, ethyl acetate, methanol, ethanol, acetone, and the like. The concentration of the photosensitizer in the solvent will control the thickness of the coating and this will influence the time needed for satisfactory exposure in the development of the printing plate. A preferred photosensitizer coating solution consists of between about 1 percent and 10 percent iodoform in acetone. The coating solution can be applied by pouring, spreading, dipping, rolling, whirl-coating, wiping on or spraying in a conventional manner. The photosensitizer coating can be applied in multiple layers, with each layer being dried before the next one is applied so as to produce an overall coating of any desired thickness. However, it is one of the advantages of the present invention that excellent planographic plates can be produced with the application of a single-layer coating of photosensitizer. The thickness of the photosensitizer coating will depend upon the concentration of the solution employed. The coating thickness can be varied by using a lesser or greater concentration of photosensitizer in the solution. When the hexavalent chromium photosensitizers are employed, it is not necessary to use albumen, dextrin, casein, or other similar colloid as is usually employed in the preparation of lithographic printing plates.

The printing plates which have a halogen-bearing photosensitizer incorporated in the plate or coated on the plate surface are outstanding for both continuous tone and half-tone printing. The printing plates which have the diazo or hexavalent chromium type of photosensitizer coated on the plate surface are excellent for use in half-tone printing applications but are not the equal of the printing plates which use a halogen-bearing photosensitizer for continuous tone printing.

The sheeted photosensitized composition can be exposed, developed and used directly in a printing operation. It has been found convenient to laminate or glue the sheeted photosensitive composition onto a substrate. The photosensitive composition can be bonded directly by heat and pressure to cloth, paper, grained zinc, and the like. A very satisfactory method is to form a sandwich of two sheets of the photosensitive composition with a layer of glass cloth in between. The materials bond together through the open spaces in the glass cloth weave. One advantage of this particular type of plate is that both sides of the plate can be used as printing surfaces.

The printing plate is exposed to a light source through a transparent pattern (e.g., a negative) to form an image on the photosensitive surface. The negative can be either the continuous tone or half-tone type. The light source can be sunlight, carbon-arc light, mercury vapor light or other light source of suitable intensity.

It appears that the image is formed due to the fact that each infinitesimal area of the coating hardens in proportion to the amount of light it receives and consequently becomes proportionally less hydrophilic. As in Collotype printing plates, the various parts of the exposed coating accept water in an amount inversely proportional to the quantity of light they receive. These areas accept a complementary quantity of ink directly proportional to the intensity of light which acted upon the coating. Those areas which received no light absorb a maximum quantity of water during printing and completely repel the greasy ink. Those areas exposed to sufficient light to render them completely hydrophobic absorb the maximum amount of ink, and those areas which during exposure received intermediate amounts of light accept an intermediate amount of ink in proportion to the intensity of light they received. This apparent mechanism of acceptance and rejection of water and ink proportional to light exposure provides the continuous tone nature of the printing plate image and the subsequent reproductions.

Printing plates produced according to the practice of the present invention are capable of providing excellent reproductions in printing processes. The disadvantages of half-tone dot structure techniques described hereinbefore are avoided. The photosensitive compositions of the present invention form printing plates which are tougher and more durable than the gelatin base plates heretofore used in continuous tone printing. The invention photosensitive compositions are also more versatile than the gelatin base plates since the properties of toughness and water receptivity can be readily and reproducibly controlled simply by varying the weight ratio of poly(ethylene oxide) to phenolic resin component. Furthermore, the invention compositions absorb and release water more slowly than does gelatin. These more favorable water absorption characteristics permit easily controllable water capacity and provide improved control of color density during a press run. Further, no development of the continuous tone image on the plates after exposure to light is required, thus eliminating the necessity for special chemicals and the necessity for complicated development techniques which must be rigidly controlled within narrow limits.

The photosensitive compositions of the present invention are especially useful as lithographic half-tone and continuous tone printing plates. The photosensitive compositions can be handled as solids without the necessity of employing solution coating methods. The photosensitive compositions can be milled or calendered into films or sheets, and these can be used directly or they can be laminated or glued to form various printing plate constructions.

The plastic printing plates of the present invention are superior to the standard metal-base printing plates employed in the lithographic industry. The printing plates of the present invention are tough and durable and there is no difficulty with the image areas wearing away when subjected to normal pressroom practices. Since the plates can be prepared with a paper or plastic substrate, they are more flexible than metal-base plates and this permits more latitude in storage and greater convenience in mounting on printing presses. The printing plates will not kink and they are extremely scratch resistant. Unlike conventional metal-base plates, the non-image areas are not metal. Hence, there is no difficulty with pitting and corrosion, and because there is no graininess, it is possible to print perfect dots in half-tone printing. This particular advantage is illustrated by the fact that negatives of screening of three hundred lines per inch or higher can be employed.

Another significant difference between the printing plates of the present invention and the conventional lithographic diazo printing plates is the fact that the invention plates have a one-phase printing surface while the conventional plates after they are developed have two phases, i.e., the diazo decomposition product phase and the exposed metal-base phase. The plastic-base printing plates of this invention are useful in offset lithographic printing, and in direct printing with standard dampening and inking systems.

The base-modified polyether-phenolic planographic printing plate compositions of the present invention demonstrate superior properties to the acid-modified polyether-phenolic printing plates which were recently developed. The photosensitive printing plate compositions of the present inpention can be sheeted and molded at higher temperatures than the acid-modified polyether-phenolic printing plate compositions. The present invention compositions do not degrade even when processed at temperatures of 200° C. and higher. These higher processing temperatures have been found to be beneficial in that the plates produced are tougher and remain tint-free longer during printing operations. The base-modified printing plate compositions of the present invention are also easier to mill and have outstanding processability in calendar operations. In contrast to the acid-modified printing plate materials, the present invention printing plate compositions have no release problem and are generally similar to vinyls in their calendering ability. The plates are able to print in a broader density range, i.e., larger tonal scale, than the acid-modified printing plate compositions. It has also been observed that the present invention printing plate compositions can be milled indefinitely without tackiness returning.

The polyether-phenolic planographic printing plate compositions of the present invention containing the polyhydric aromatic component are superior to compositions which are identical except for the exclusion of this component. The incorporation of a polyhydric aromatic component in the compositions of the present invention greatly improves the processability of the polyether-phenolic resinous material. Longer milling cycles can be performed without degradation of the composition components. Printing plates pressed from the photosensitive materials are tougher and require less light exposure time to obtain good ink receptivity during a printing operation.

While not wishing to be bound by any theory of mechanisms, it is believed that the outstanding characteristics of the photosensitive compositions of the present invention as employed in the preparation and use of half-tone and continuous tone planographic printing plates are mainly due to the "association" or "complex" formation between the phenolic resin component and the ethylene oxide polymer component. The term "association" refers to the interaction which provides the binding force between the poly(ethylene oxide) compound and the phenolic resin component. It is believed that the interaction involves one or more diverse mechanism such as hydrogen bonding, electrostatic bonding, secondary valence forces, and the like. It appears that the phenomenon concerning hydrogen bonding can best explain the nature of the interaction. The "associating" or "complexing" interaction between the phenolic resin component and the ethylene oxide polymer component in the photosensitive compositions might be visualized in the following manner:

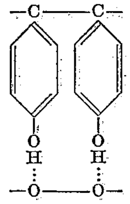

The "association" of the phenolic resin component and the ethylene oxide polymer component causes the formation of a tough, hydrophilic material when sheeted or molded. The water receptivity of this "association" product declines as the phenolic resin "advances," that is, increases in molecular weight and/or in degree of cross-linking on exposure to light, and/or the methylol content of the phenolic resin decreases. Radicals released by the action of light on the photosensitizing agent in the composition (for example, iodine radicals released from iodoform) react with the phenolic resin to produce intermediate chemical products. These prodnucts presumably react with each other as well as with unactivated phenolic molecules to produce "advanced" high molecular weight phenolic derivatives of lower methylol content or cause a degradation of the ethylene oxide polymer. This causes the water receptivity of the phenolic resin/ethylene oxide polymer coating to decline in proportion to the radicals produced, which is in turn proportional to the intensity of the light received by a particular portion of the coating during exposure'

The above-postulated mechanisms of interaction are merely theoretical and should not be construed as limiting thereto. Other theories or reasons may equally well explain the true nature of the interaction.

The following examples will serve to illustrate specific embodiments of the invention.

ILLUSTRATION I

This example illustrates the preparation of conventional phenolic resins useful in the practice of the present invention.

*(a) Phenol-formaldehyde resole phenolic resin*

A mixture consisting of 1 mole of phenol, 3 moles of paraformaldehyde, 6 moles of water and 0.3 mole of sodium acetate trihydrate is refluxed at atmospheric pressure for a period of time between about two and one-half hours and three and one-half hours until the solution becomes cloudy. Two distinct phases begin to form as the resin precipitates from the refluxing mixture. Heating is continued for an additional five minutes and the hot mixture is then poured into water to completely precipitate the resin. The solid resin is recovered by filtration or decantation or other suitable separation method and washed thoroughly with water.

*(b) Meta-cresol-formaldehyde resole resin*

Meta-cresol, paraformaldehyde and sodium acetate trihydrate in a molar ratio of 1:2.5:0.3, respectively, are mixed in water to form a dilute slurry (about 20 milliliters of water per mole of meta-cresol). This mixture is refluxed at atmospheric pressure until resin begins to precipitate, which is normally about a twenty-minute reaction period. The heating is continued an additional five minutes, and the reaction mixture is poured into cold water to completely precipitate the resin.

*(c) Resorcinol-formaldehyde resole resin*

A mixture of resorcinol, sodium sulfate and formalin (37 percent solution of formaldehyde in water) in a molar ratio of about 1:0.2:0.8, respectively, is dissolved in water (about 100 milliliters of water per mole of resorcinol). The reaction mixture is heated on a steam bath until the solution turns cloudy, then it is poured into cold water to completely precipitate the resin product.

(*d*) *Phenol-formaldehyde novolak resin*

One hundred grams of phenol is dissolved in 69 grams of 37 percent formalin solution and about 0.55 gram of oxalic acid is added. The mixture is refluxed at a temperature of about 80° C. for a period of about 6 hours at the end of which period the solution becomes cloudy. Water is then distilled from the reaction mixture until the temperature of the resinous mass reaches about 150° C. The resin is then discharged from the reaction vessel and allowed to cool. At room temperature the cooled resin is brittle and is readily pulverized to a powdery state.

ILLUSTRATION II 150 grams of 37 percent formalin, 100 grams of phenol, and 3 grams of sodium hydroxide are refluxed for one and one-half hours at 22 inches of vacuum. This is followed by the addition of 1.3 grams of boric acid dispersed in 25 grams of water. The material is then dehydrated by distillation at 26 inches of vacuum until the temperature rises to 95° C. The resin is discharged from the still, allowed to cool to a brittle mass and then pulverized.

ILLUSTRATION III

This illustration further exemplifies the production of resole phenolic resins which are excellent for the practice of the present invention.

| Components | I | II | III | IV | V | VI |
|---|---|---|---|---|---|---|
| Phenol | 100 | 100 | 100 | ------ | 100 | 100 |
| m-Cresol | -------- | -------- | -------- | 100 | -------- | ------ |
| 37% formalin | 150 | 150 | 120 | 90 | 100 | 90 |
| $Ba(OH)_2$ | 3 | -------- | -------- | ------ | -------- | ------ |
| 75% $H_3PO_4$ | 1.6 | -------- | -------- | ------ | -------- | ------ |
| 25% NaOH | -------- | 3 | 3 | ------ | 4 | ------ |
| $H_3BO_3$ | -------- | 1.26 | 1.26 | ------ | 1.5 | ------ |
| Hexamethylenetetramine | 5.5 | -------- | -------- | 6 | -------- | 5.6 |

These resins are produced by refluxing the respective reaction mixtures with about 50 parts of water at 22 inches of vacuum for about one and one-half hours. The acid (if any) is then added. Distillation to remove water is conducted until the temperature rises to 95° C. to 100° C. The resin is cooled and then pulverized for use in the production of the invention compositions.

EXAMPLE 1

750 grams of powdered poly(ethylene oxide) (approximate molecular weight in the range between three million and four million), 500 grams of powdered resole resin,[2] 75 grams of sodium stearate as basic component, and 150 grams of water were mixed into a paste. The paste was charged to a Banbury blender which had the rollers heated to 100° C. The mixture was blended for about five minutes, then the rollers were set at about 130° C. and the milling was continued until the material became non-rubbery and sheeted well. The material was then transferred to a calender (first roller, 150° C.) with the rollers set at progressively lower temperatures. The blended material was calendered to a continuous roll of film about 2 to 4 mils in thickness.

The sheeted resinous material was contacted with kraft paper which, in turn, was pressed on a sheet of polyethylene. The materials were pressed together for three minutes at 300 p.s.i. at a temperature of 190° C. The resulting product was a permanently bonded laminate of sufficiently good creep resistance to be employed for printing in good register on a standard offset printing press.

[2] The phenolic used was prepared by refluxing 150 parts of 37 percent formalin, 100 parts of phenol and 3 parts of sodium hydroxide at 22 inches of vacuum pressure for one and one-half hours. This was followed by the addition of a water slurry containing 1.3 parts of boric acid. The reaction mixture was then dehydrated by distillation under 26 inches of vacuum pressure until the temperature of the reaction mixture increased to 95° C.

The plastic laminate plate material was sensitized by whirling on a 5 percent solution of iodoform in acetone. The plate was covered with a continuous tone photographic negative, and exposed for five minutes at two feet with a 15 ampere carbon arc lamp. The exposed plate was mounted on a Multilith Model 1250 offset press and excellent printing was obtained. The same results were obtained when a half-tone negative was employed for the exposure of the plate.

In a similar manner, plastic laminate plate material was sensitized by whirling on a solution of commercial diazo sensitizer. When the plate coating had dried, the plate was covered with a screened photographic negative, and exposed for five minutes at two feet with a 15 ampere carbon arc lamp.

The plate was mounted on a standard offset printing press and excellent printing was obtained.

EXAMPLE 2

This example illustrates the preparation of a variety of printing plate compositions within the scope of the present invention.

The compositions were prepared in the manner of Example 1 by blending together 30 grams of poly(ethylene oxide), 20 grams of resole resin and 5 grams of basic component as listed in the following table. The compositions were calendered, laminated and shaped into printing plates, and coated with a photosensitizer.

*Table*

| No. | Poly-(ethylene oxide)[1] | Resole resin[2] | Sensitizer | Basic additive |
|---|---|---|---|---|
| 1 | C | $R_1$ | $CHI_3$[4] | Sodium stearate. |
| 2 | C | $R_1$ | $CHI_3$ | Lithium stearate. |
| 3 | E | $R_2$ | $CHI_3$ | Do. |
| 4 | C | $R_3$ | $CHI_3$ | Sodium stearate. |
| 5 | C | $R_1$ | $CHBr_3$[5] | Do. |
| 6 | C | $R_1$ | $CHI_3$ | Sodium stearate plus sodium hydroxide.[4] |
| 7 | C | $R_1$ | $CHI_3$ | Magnesium stearate. |
| 8 | C | $R_1$ | $CHI_3$ | Calcium stearate. |
| 9 | C | $R_1$ | $CHI_3$ | Barium stearate. |
| 10 | C | $R_1$ | $CHI_3$ | Lithium hydroxystearate. |
| 11 | D | $R_1$ | $CHI_3$ | Sodium stearate. |
| 12 | A | $R_1$ | $CHI_3$ | Sodium stearate.[8] |
| 13 | B | $R_1$ | $CHBr_3$ | Do.[8] |
| 14 | A | $R_1$ | $CHI_3$ | Calcium stearate plus lime (6:1). |
| 15 | A | $R_1$ | $CHI_3$ | Sodium oleate. |
| 16 | A | $R_1$ | $CHI_3$ | Sodium borate. |
| 17 | A | $R_1$[3] | $CHI_3$ | Sodium stearate. |
| 18 | A | $R_1$ | $CHI_3$-$CHBr_3$[6] | Do. |
| 19 | A | $R_1$ | ST[7] | Do. |
| 20 | A | $R_1$ | $CHI_3$ | Sodium stearate plus sodium acetate (5:1). |
| 21 | A | $R_1$ | $CHI_3$ | Lithium stearate plus sodium acetate (5:2). |

[1] A=M.W. of approximately 200,000.
B=M.W. of approximately 500,000.
C=M.W. between about 3,000,000 and 4,000,000.
D=M.W. over 4,000,000.
[2] $R_1$=Resole prepared in the same manner as Example 2.
$R_2$=Resole prepared in the same manner as Example 3 (IV).
$R_3$=Resole prepared in the same manner as Example 3 (I).
[3] 30 grams of resole resin.
[4] Coating with 5 percent solution of $CHI_3$ in acetone.
[5] Coating with $CHBr_3$.
[6] Coating with solution of 1.5 grams of $CHI_3$ dissolved in $CHBr_3$.
[7] Coating with Pitman ST sensitizer.
[8] 3 grams of base used.

The printing plates were found to be excellent for both half-tone and continuous tone printing. It was not necessary to develop the plates after they were exposed through a continuous tone or screened negative.

Excellent printing plate compositions are also produced when poly(propylene oxide) is employed in place of poly(ethylene oxide) and also when the phenolic resin component is produced from meta-cresol, resorcinol, and the like, and formaldehyde or furfural.

Similarly, the printing plates provide excellent printing results when the photosensitizer is a diazo compound such as 4,4′-diazidostilbene 2,2′-disulfonic acid sodium salt, or a hexavalent chromium compound such as sodium bichromate, which is coated on the surface of the plastic-base printing plate composition. Excellent results are also obtained when the basic component is a strong base such as sodium hydroxide or a weak base such as sodium carbonate or ammonium hydroxide.

Printing plate compositions are similarly prepared using novolak phenolic resins. These compositions are aided to an equivalent degree by the addition of basic compound and plates made from these compositions give very good prints when photosensitized and exposed.

EXAMPLE 3

300 grams of powdered poly(ethylene oxide) (approximate molecular weight in the range between three million and four million), 200 grams of powdered resole resin,[3] 30 grams of sodium stearate as the basic additive, 50 grams of resorcinol, as the polyhydric aromatic component and 60 grams of water were mixed into a paste. The paste was charged to a Banbury blender which had the rollers heated to 100° C. The mixture was blended until the mix temperature increased to 140° C. Then the material was milled on a two-roll mill set at about 130° C. and the milling was continued until the material became non-rubbery and sheeted well. The material was then transferred to a calender (first roller, 150° C.) with the rollers set at progressively lower temperatures. The blended material was calendered to a continuous roll of film about 2 mils in thickness.

The sheeted resinous material was contacted with kraft paper which, in turn, was pressed on a sheet of polyethylene. The materials were pressed together for three minutes at 300 p.s.i. at a temperature of 190° C. The resulting product was a permanently bonded laminate of sufficiently good creep resistance to be employed for printing in good register on a standard offset printing press.

The plastic laminate plate material was sensitized by wiping the surface with a 5 percent solution of iodoform in acetone. The plate was covered with a half-tone photographic negative, and exposed for five minutes at two feet with a 15 ampere carbon arc lamp. The exposed plate was mounted on a standard offset press and excellent printing was obtained.

In a similar manner, plastic laminate plate material can be sensitized by whirling on a solution of Pitman ST coating. When the plate coating is dried, the plate is covered with a screened photographic negative, and exposed for five minutes at two feet with a 15 ampere carbon arc lamp. According to the directions of the manufacturer, the exposed plate is developed with Pitman ST Developer and Pitman ST Developing Ink. Development of the plate in this manner is not necessary with the printing plates of the present invention. Excellent printing is obtained when the plate is employed on a standard offset press.

Following the same procedure, good plastic printing plate material was obtained employing each of 1,3,5-trihydroxybenzene; 1,4-dihydroxybenzene and 1,2-dihydroxybenzene as the polyhydroxybenzene component in place of resorcinol.

EXAMPLE 4

This example illustrates the preparation of a variety of printing plate compositions within the scope of the present invention.

[3] The phenolic used was prepared by refluxing 1500 grams of 37 percent formalin, 1000 grams of phenol and 30 grams of sodium hydroxide at 22 inches of vacuum pressure for one and one-half hours. This was followed by the addition of a water slurry containing 13 grams of boric acid. The reaction mixture was then dehydrated by distillation under 26 inches of vacuum pressure until the temperature of the reaction mixture increased to 95° C. The resin product was discharged from the still and pulverized.

The compositions were prepared in the manner of Example 3 by blending together 30 grams of poly(ethylene oxide), 20 grams of resole resin [same as resin in Illustration Ic], 3 grams of basic component and 5 grams of resorcinol (7 grams used in composition No. 2) as listed in the following table. The compositions were calendered, laminated and shaped into printing plates, and coated with a photosensitizer.

*Table*

| No. | Poly(ethylene oxide)[1] | Base | Sensitizer |
|---|---|---|---|
| 1 | C | Sodium stearate[2] | $CHI_3$.[3] |
| 2 | C | do.[2] | $CHI_3$. |
| 3 | B | do.[2] | $CHI_3$. |
| 4 | C | do.[2] | $CHI_3$.[4] |
| 5 | A | do.[2] | $CHI_3$. |
| 6 | D | do.[2] | $CHI_3$. |
| 7 | C | do.[2] | $CHBr_3$.[5] |
| 8 | C | do.[2] | $CHI_3$-$CHBr_3$.[6] |
| 9 | C | do.[2] | ST.[7] |
| 10 | C | do.[2] | FH No. 4.[8] |
| 11 | C | Sodium stearate plus lime (4:1). | $CHI_3$. |

[1] A=M.W. of approximately 200,000.
B=M.W. of approximately 500,000.
C=M.W. between about 3,000,000 and 4,000,000.
D=M.W. over 4,000,000.

[2] 5 grams of base used.

[3] Coating with 5 percent solution of $CHI_3$ in acetone.

[4] $CHI_3$ incorporated internally as a component of the resin composition.

[5] Wiped on surface of printing plate as a coating.

[6] Coating with solution of $CHI_3$ dissolved in $CHBr_3$ (1:10).

[7] Coating with Pitman ST Sensitizer (H. M. Pitman Company, New York).

[8] Fairmount Hardener No. 4 (Fairmount Chemical Company, Newark, New Jersey); soluble diazo condensate for ink-absorbing images on lithographic plates.

The printing plates were found to be excellent for both half-tone and continuous tone printing. It was not necessary to develop the plates after they were exposed to light through a continuous tone or screened negative.

In the same manner, good results are obtained when poly(ethylene oxide-propylene oxide) or poly(propylene oxide) is used as the polyether component; and/or one or more of lithium stearate, calcium stearate, lime, sodium hydroxide, oleamide, palmitamide, triethanolamine, diphenylurea and ammonium hydroxide are used as the basic component; and/or the phenolic resin is produced from meta-cresol or resorcinol and formaldehyde or furfural; and/or the photosensitizer is a diazo compound such as 4,4′-diazidostilbene-2,2′-disulfonic acid sodium salt, or a hexavalent chromium compound such as sodium bichromate which is coated on the surface of the plastic-base printing plate composition; and/or the polyhydroxybenzene component is one or more of 1,3,5-trihydroxybenzene, 4-methyl-1,2-dihydroxybenzene and 4-chloro-1,2-dihydroxybenzene.

Similarly printing plate compositions made in an identical manner except that novolak phenolic resins are used in place of the resole phenolic resin, are enhanced by the addition of a polyhydric aromatic composition in combination with a basic compound exhibiting a pH greater than 7.

What is claimed is:

1. A photosensitive composition consisting essentially of (1) a heat fusible phenolic resin, (2) from about 0.2 to 3 parts per part phenolic resin of an ethylene oxide polymer having an average molecular weight from about 50,000 to about 10,000,000, (3) from about 0.08 to about 0.2 part per part phenolic resin of a photosensitizing agent which when acted upon by light energy at ambient temperatures yields free radicals capable of reaction with the resinous components of the composition wherein said photosensitive composition becomes more oleophilic on exposure to light, (4) from about 1 to about 50 weight percent based upon the weight of the phenolic resin of a non-oxidizing, photo-insensitive, basic compound which exhibits a pH greater than 7, and (5) an amount up to about 0.4 part per part phenolic resin of a polyhydric aromatic compound containing from 6 to 12 carbon atoms and from 2 to 4 aromatic hydroxyl groups so disposed that said polyhydric aromatic compound contains at least 2 reactive aromatic hydrogen atoms.

2. The composition of claim 1 wherein said phenolic resin is a resole phenolic resin.

3. The composition of claim 1 wherein said phenolic resin is a phenol-formaldehyde phenolic resin.

4. The composition of claim 1 wherein said phenolic resin is a cresol-formaldehyde phenolic resin.

5. The composition of claim 1 wherein said phenolic resin is a rescorcinol-formaldehyde phenolic resin.

6. The composition of claim 1 wherein said photosensitizing agent is iodoform.

7. The composition of claim 1 wherein said basic compound is sodium stearate.

8. The compound of claim 1 wherein said polyhydric aromatic compound is resorcinol.

9. A photosensitive composition consisting essentially of (1) a heat fusible phenolic resin, (2) from about 0.6 to about 1.8 parts per part phenolic resin of an ethylene oxide polymer having an average molecular weight from about 50,000 to about 10,000,000, (3) from about 0.1 to about 0.13 part per part phenolic resin of a photosensitizing agent which when acted upon by light energy at ambient temperatures yields free radicals capable of reaction of the resinous components of the composition wherein said photosensitive composition becomes more oleophilic at exposure to light, (4) from about 5 to about 15 weight percent based upon the weight of the phenolic resin of a non-oxidizing photo-insensitive basic compound which exhibits a pH greater than 7, and (5) from about 0.2 to 0.3 part per part of phenolic resin of a polyhydric aromatic compound containing from about 6 to about 12 carbon atoms inclusive and from about 2 to 4 aromatic hydroxyl groups so disposed so that said polyhydric aromatic compound contains at least 2 reactive aromatic hydrogen atoms.

10. A film consisting essentially of (1) a heat fusible phenolic resin, (2) from about 0.2 to 3 parts per part phenolic resin of an ethylene oxide polymer having an average molecular weight from about 50,000 to about 10,000,000, (3) from about 0.08 to about 0.2 part per part phenolic resin of a photosensitizing agent which when acted upon by light energy at ambient temperatures yields free radicals capable of reaction with the resinous components of the composition wherein said photosensitive composition becomes more oleophilic at exposure to light, (4) from about 1 to about 50 weight percent based upon the weight of the phenolic resin of a non-oxidizing photo-insensitive basic compound which exhibits a pH greater than 7, and (5) an amount up to about 0.4 part per part of phenolic resin of a polyhydric aromatic compound containing from 6 to 12 carbon atoms and from 2 to 4 aromatic hydroxyl groups so disposed that said polyhydric aromatic compound contains at least 2 reactive aromatic hydrogen atoms.

11. A laminate comprising a film of claim 10 pressed to a substrate material.

12. A laminate of claim 11 wherein said substrate material is glass cloth.

13. A planographic printing plate comprising a plastic base material coated with a halogenated lower alkyl photosensitizing agent, said plastic base material consisting essentially of (1) a heat fusible phenolic resin, (2) from about 0.2 to 3 parts per part phenolic resin of an ethylene oxide polymer having an average molecular weight from about 50,000 to about 10,000,000, (3) from about 1 to about 50 weight percent based upon the weight of the phenolic resin of a non-oxidizing photo-insensitive basic compound which exhibits a pH greater than 7, and (4) an amount up to about 0.4 part per part of phenolic resin of a polyhydric aromatic compound containing from about 6 to about 12 carbon atoms inclusive and from about 2 to 4 aromatic hydroxyl groups so disposed so that said polyhydric aromatic compound contains at least 2 reactive aromatic hydrogen atoms.

14. A method of eliminating tackiness from printing plate compositions comprising a phenolic resin, an ethylene oxide polymer having an aromatic molecular weight from about 50,000 to about 10,000,000 and a photosensitizing agent which when acted upon by light energy at ambient temperatures yields free radicals capable of reaction with the resinous components of the composition by incorporating therein a non-oxidizing, photo-insensitive basic compound and an amount up to about 0.4 part per part phenolic resin of a polyhydric aromatic compound containing from about 6 to about 12 carbon atoms inclusive and from 2 to 4 aromatic hydroxyl groups so disposed that said polyhydric aromatic compound contains at least 2 reactive aromatic hydrogen atoms.

References Cited by the Examiner

UNITED STATES PATENTS

| | | | |
|---|---|---|---|
| 1,575,143 | 3/1926 | Beebe et al. | 96—115 |
| 1,587,270 | 6/1926 | Beebe et al. | 96—115 |
| 2,848,327 | 8/1958 | Eichorn | 96—85 |
| 2,894,931 | 7/1959 | Somerville et al. | 260—43 |
| 3,074,897 | 1/1963 | Baker | 260—29.3 |
| 3,125,544 | 3/1964 | Winslow et al. | 260—14 X |

NORMAN G. TORCHIN, *Primary Examiner.*

R. L. STONE, C. VAN HORN, *Assistant Examiners.*